INVENTORS
LEONARD F. WHITE & ERNST FISCHL

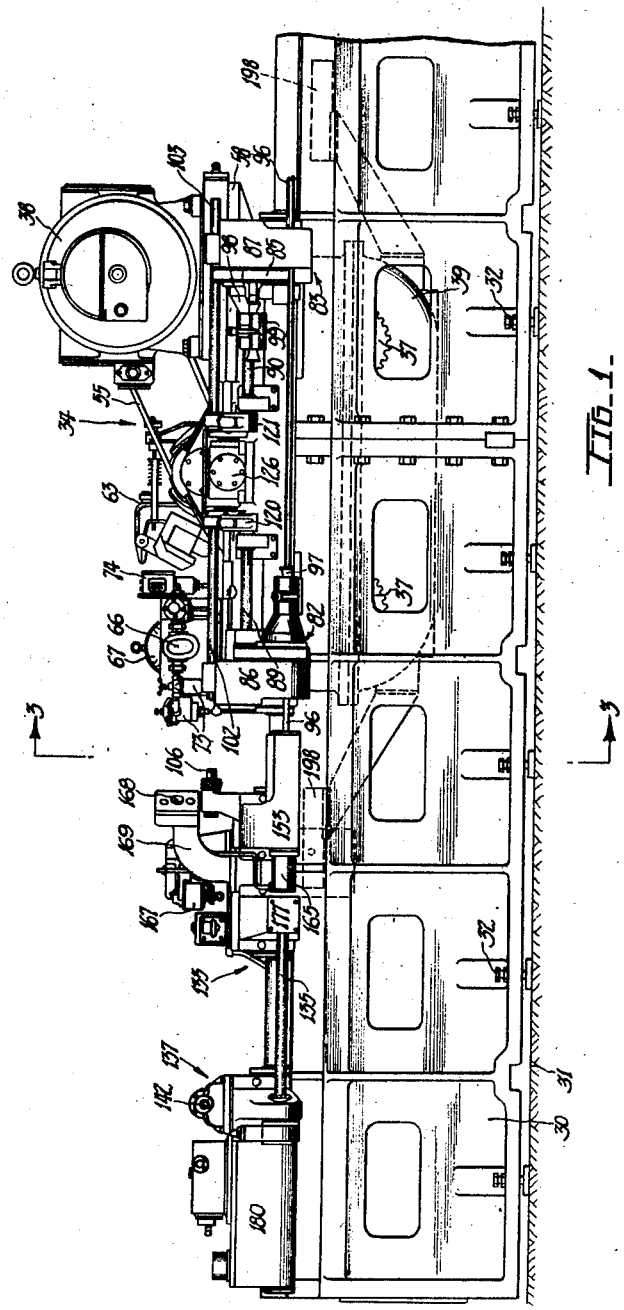

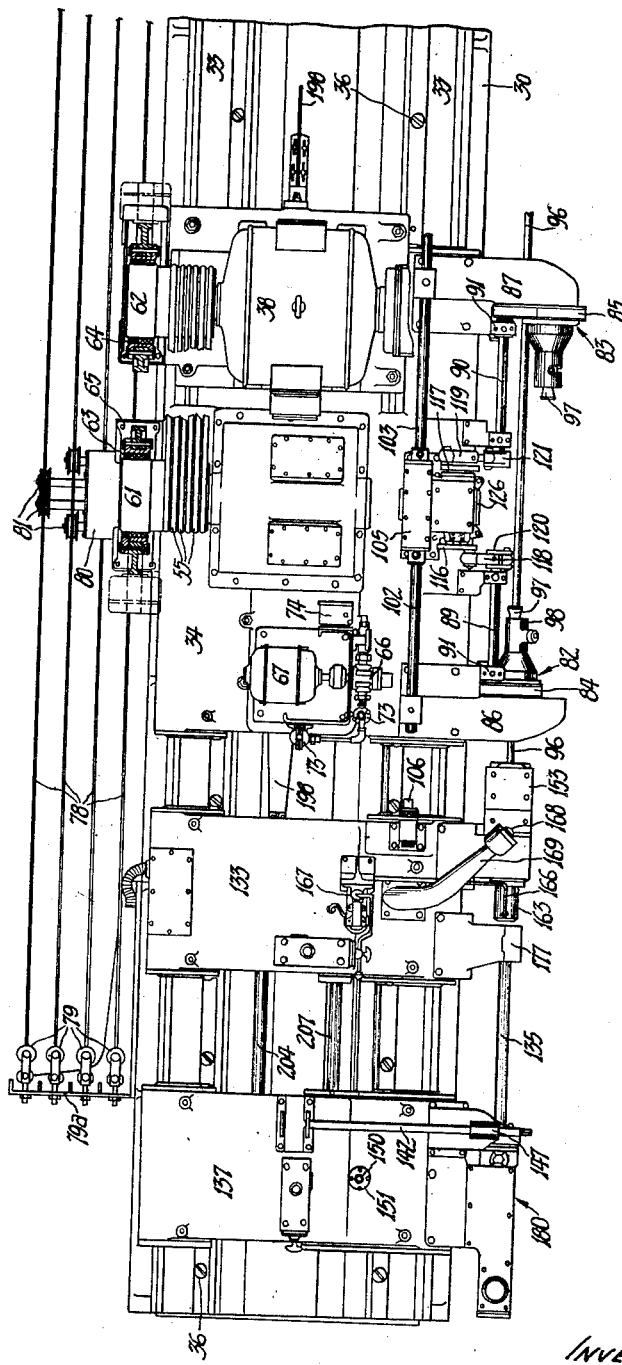

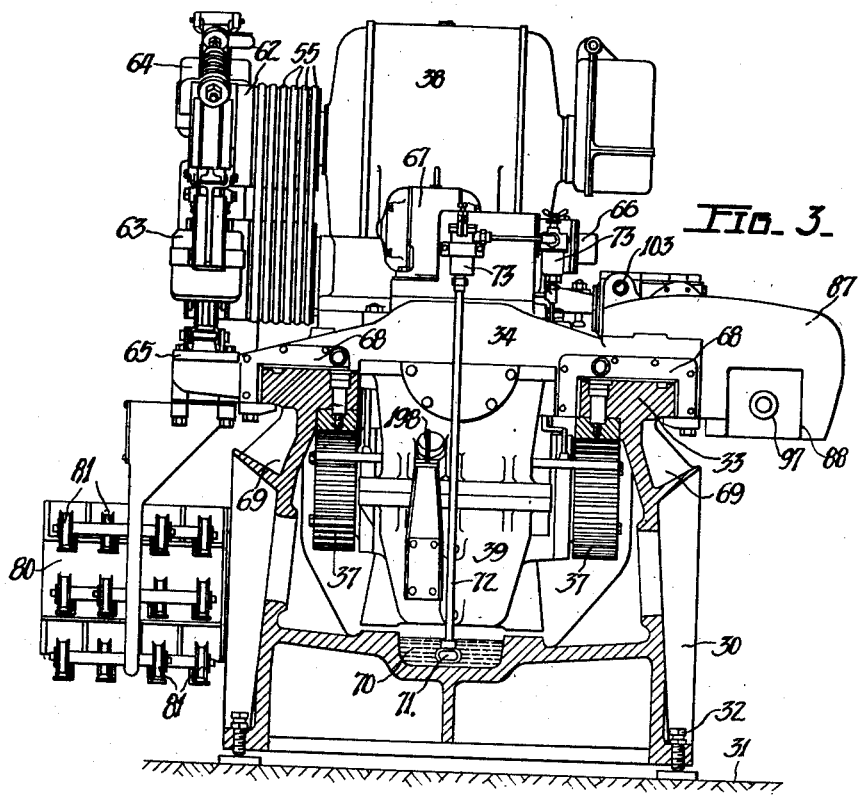
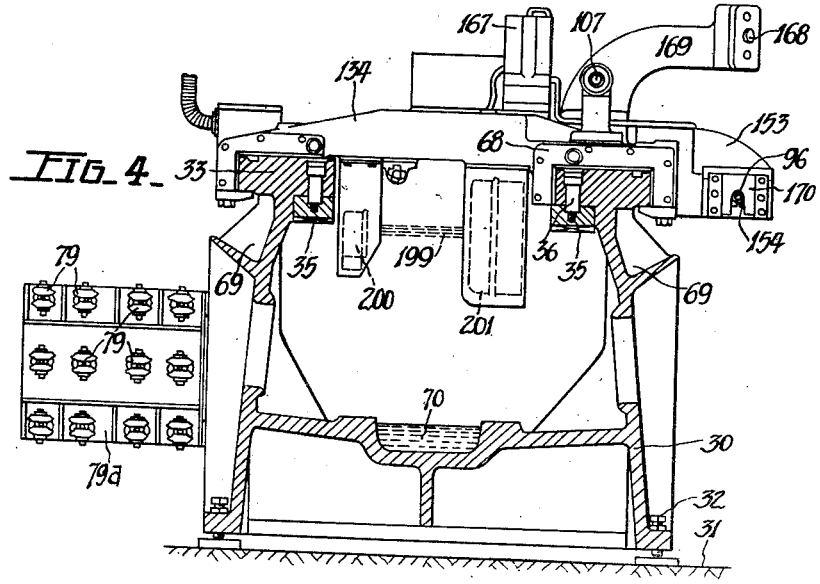

April 6, 1954
L. F. WHITE ET AL
2,674,367
DRAWBENCH
Filed Aug. 10, 1949
16 Sheets-Sheet 5
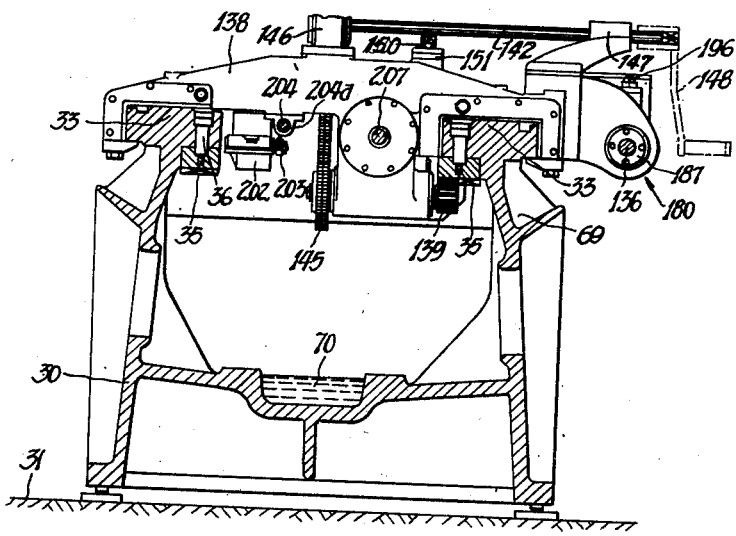
FIG_5_
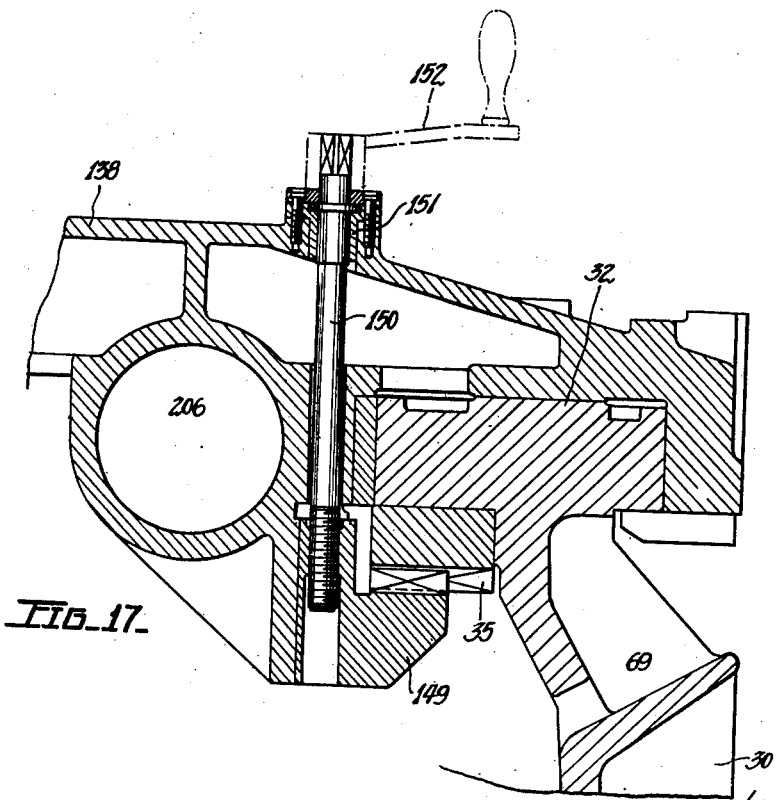
FIG_17_
INVENTORS
LEONARD F. WHITE & ERNST FISCHL
BY Young, Emery & Thompson Attys.

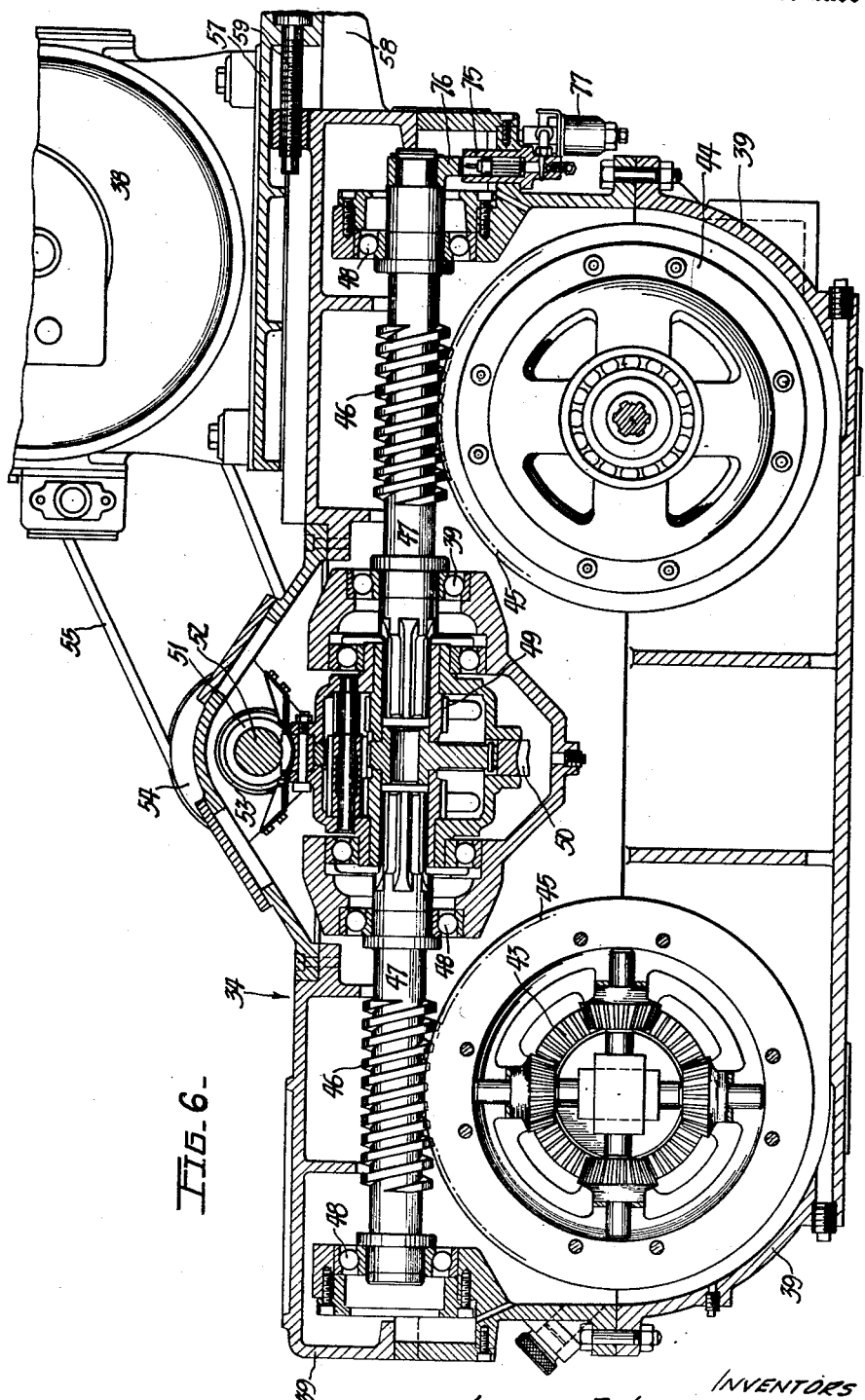

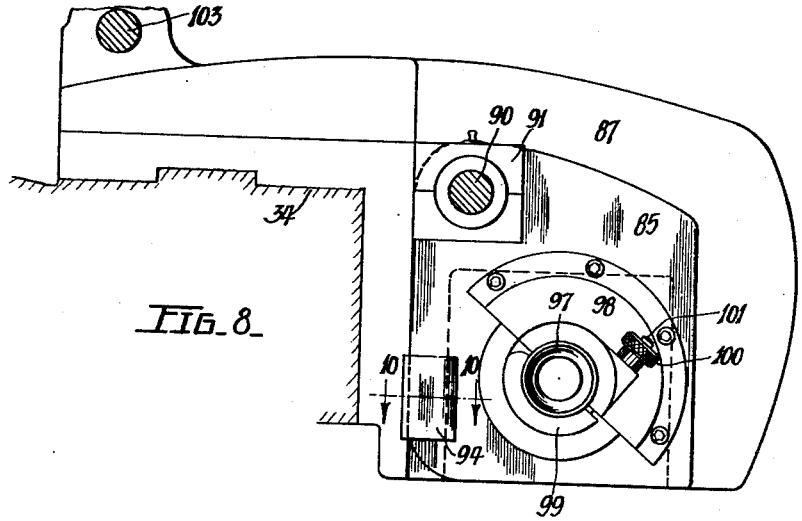
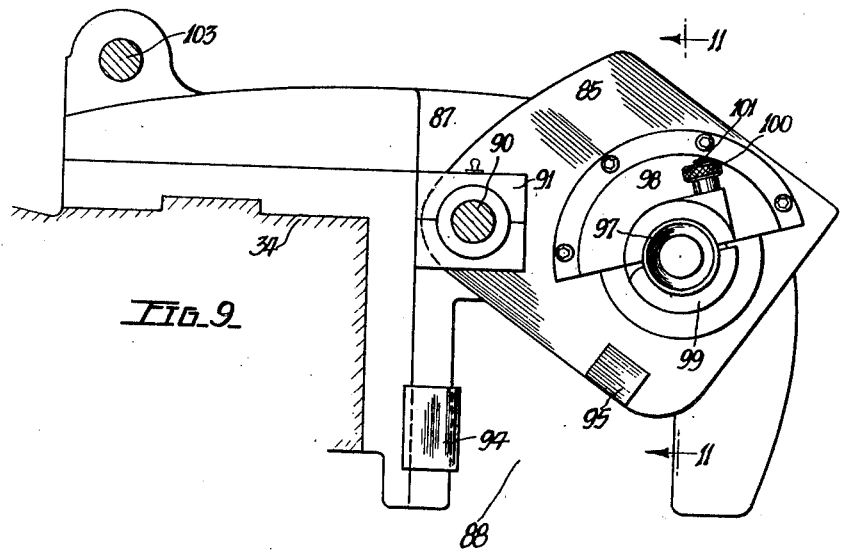
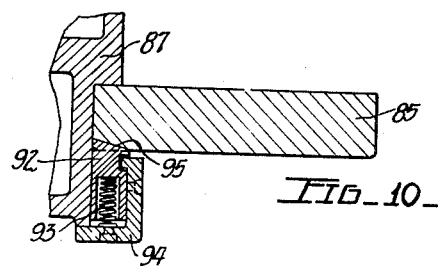

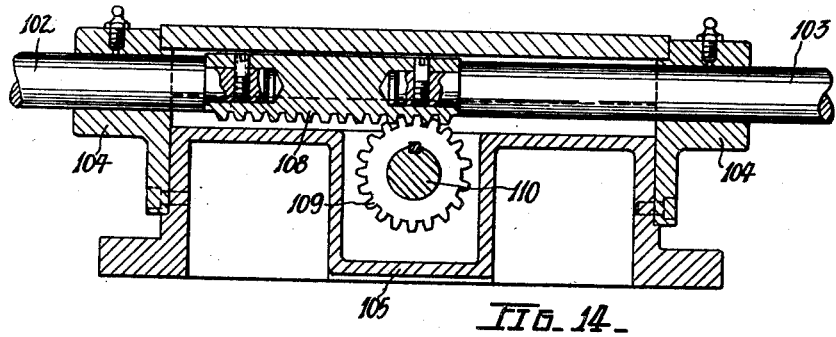
Fig. 14
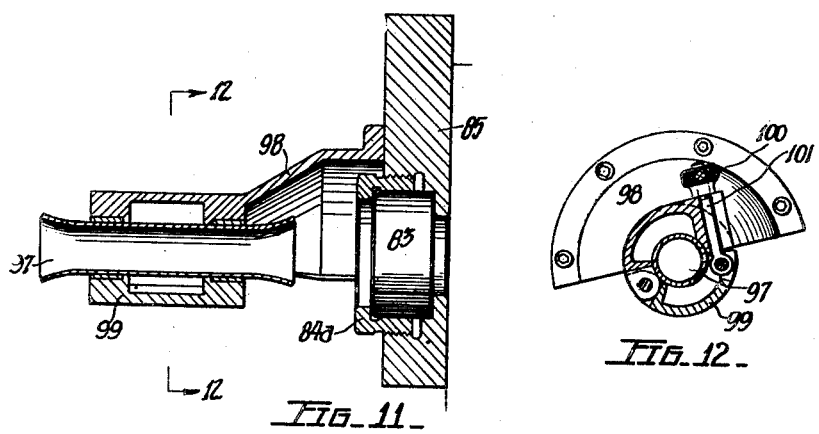
Fig. 11
Fig. 12
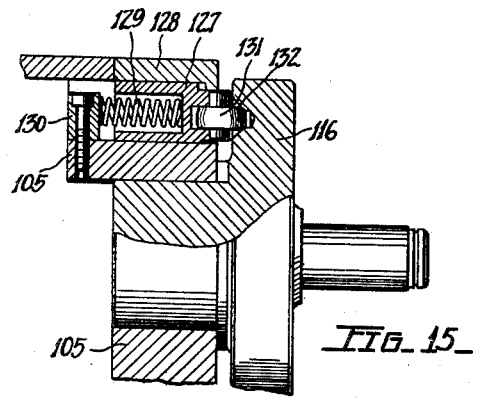
Fig. 15
INVENTORS
LEONARD F. WHITE & ERNST FISCHL
BY Young, Emery & Thompson ATTYS.

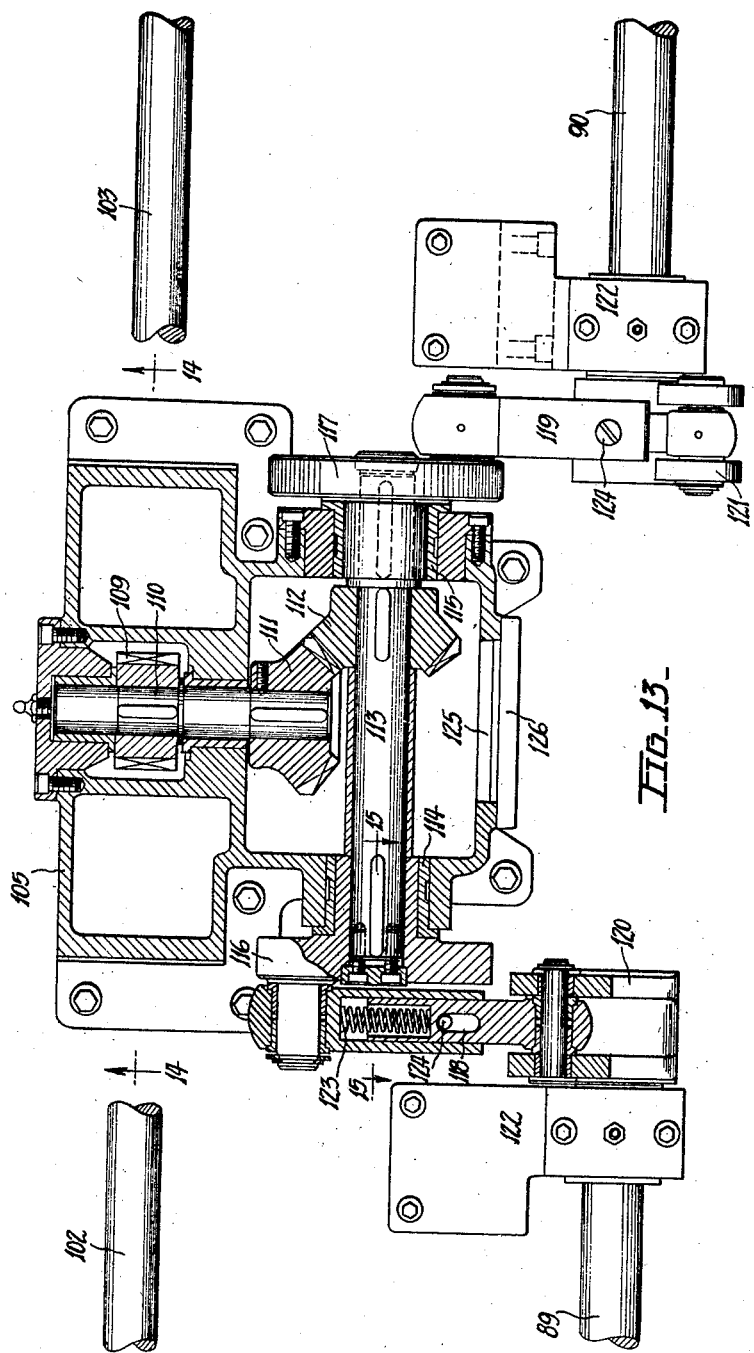

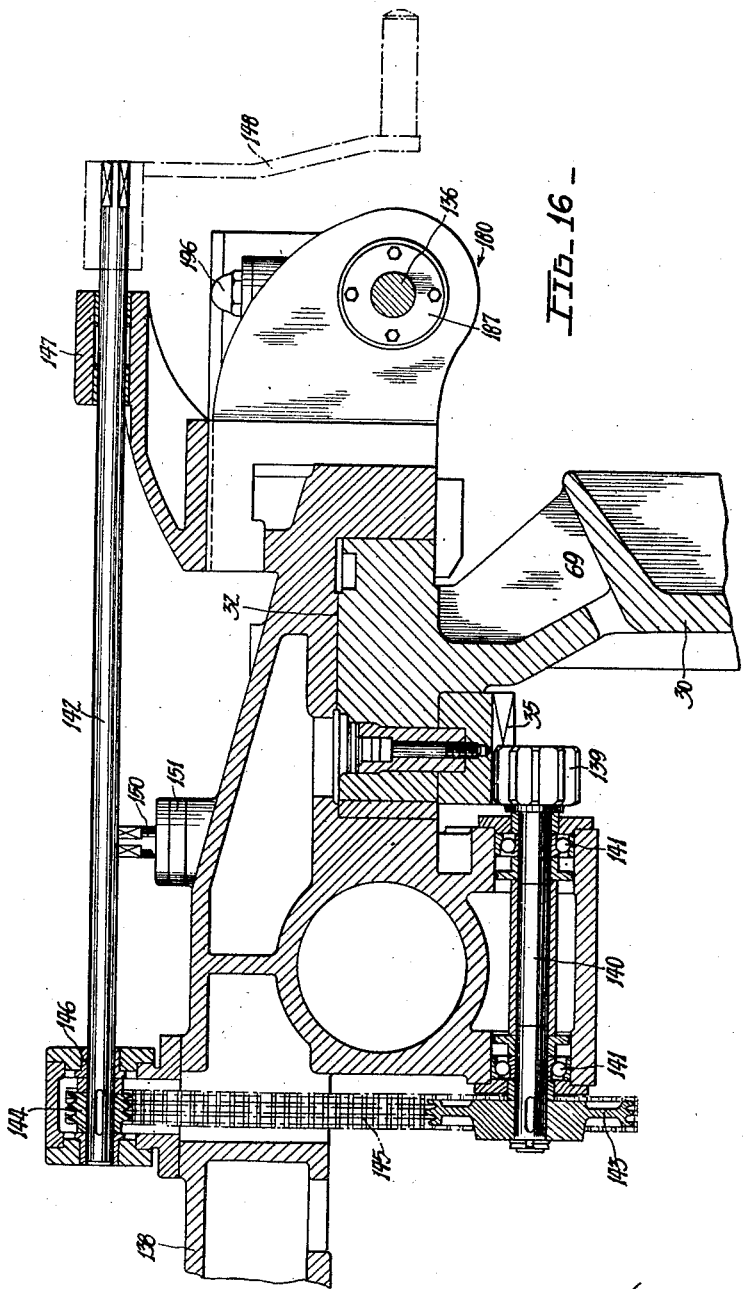

April 6, 1954 L. F. WHITE ET AL 2,674,367
DRAWBENCH
Filed Aug. 10, 1949 16 Sheets-Sheet 12
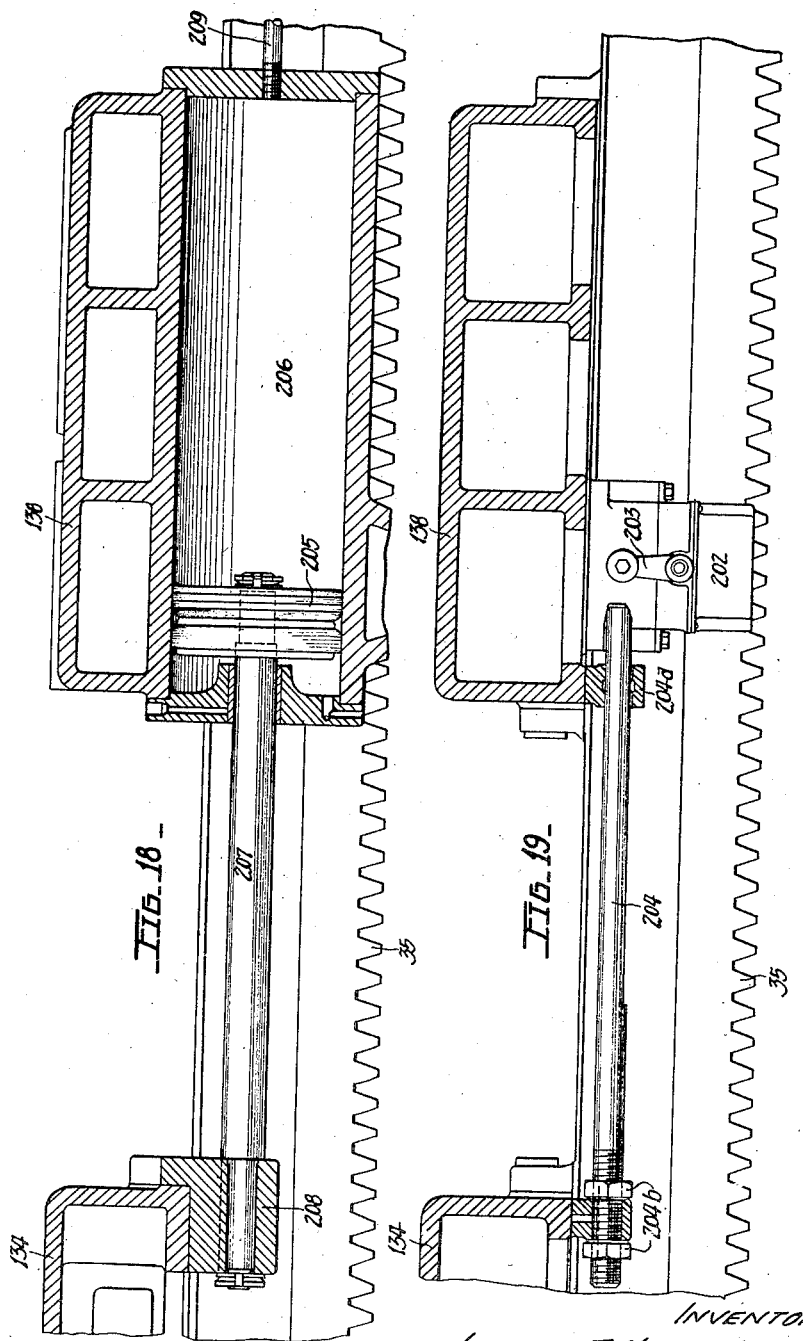
INVENTORS
LEONARD F. WHITE & ERNST FISCHL April 6, 1954 L. F. WHITE ET AL 2,674,367
DRAWBENCH
Filed Aug. 10, 1949 16 Sheets-Sheet 13

INVENTORS
LEONARD F. WHITE & ERNST FISCHL
BY Young, Emery & Thompson
ATTYS.

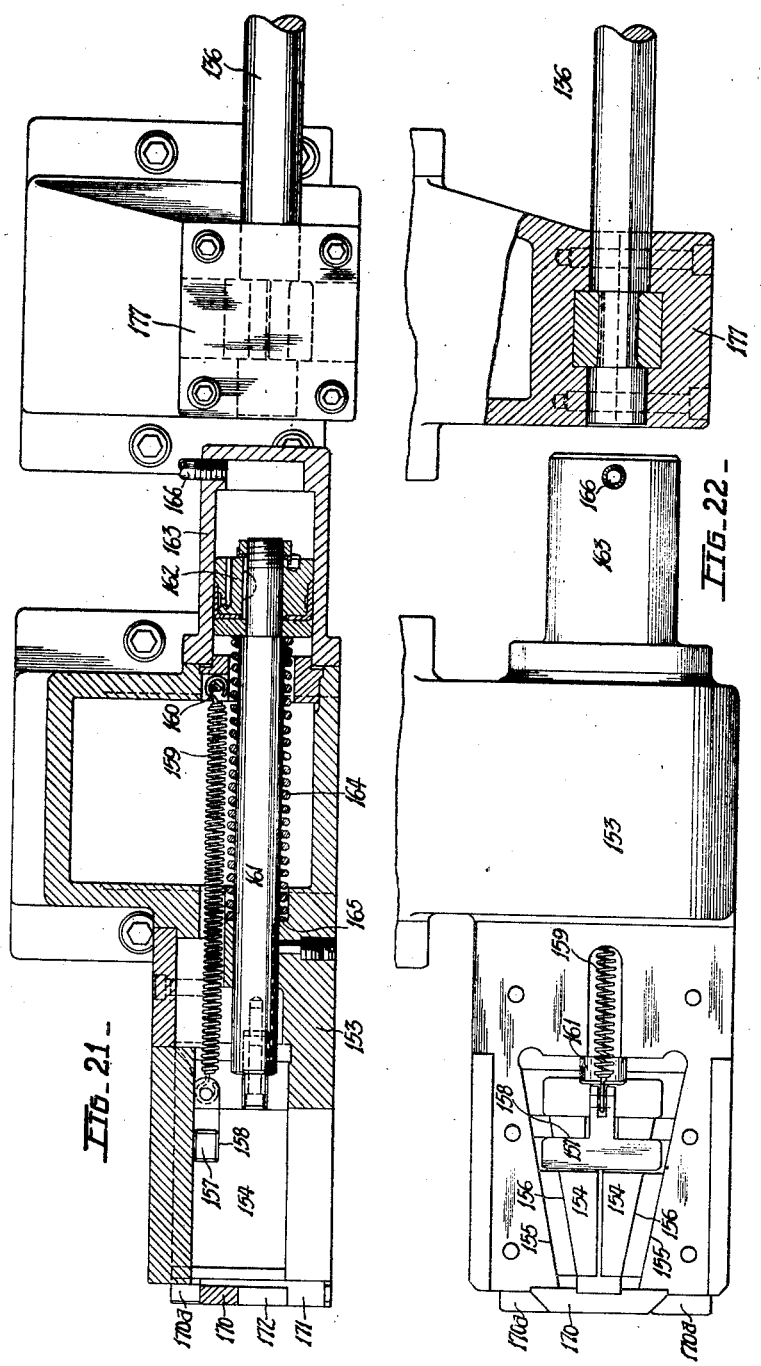

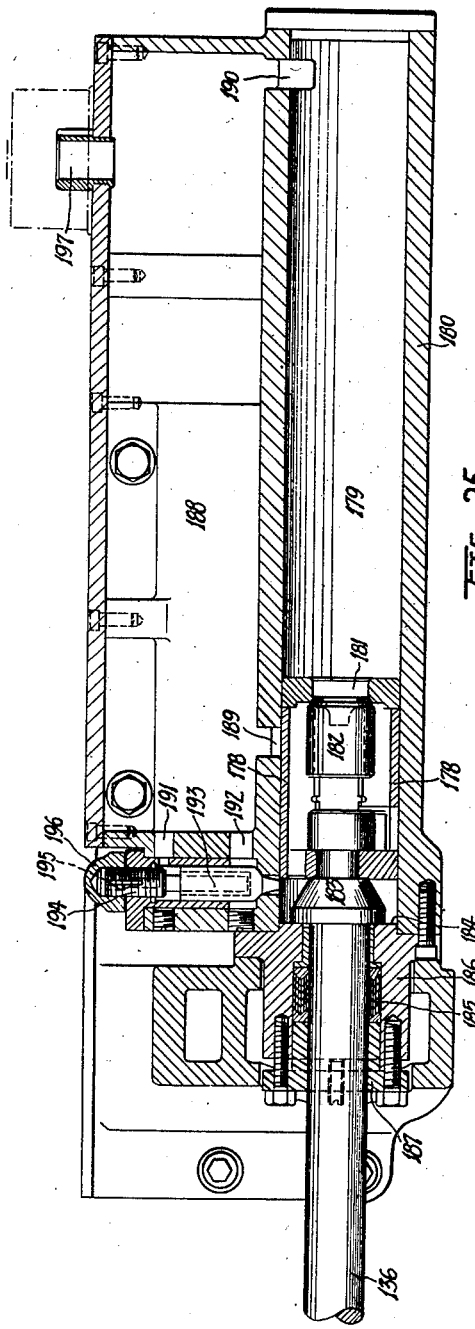

April 6, 1954     L. F. WHITE ET AL     2,674,367
DRAWBENCH
Filed Aug. 10, 1949     16 Sheets-Sheet 16
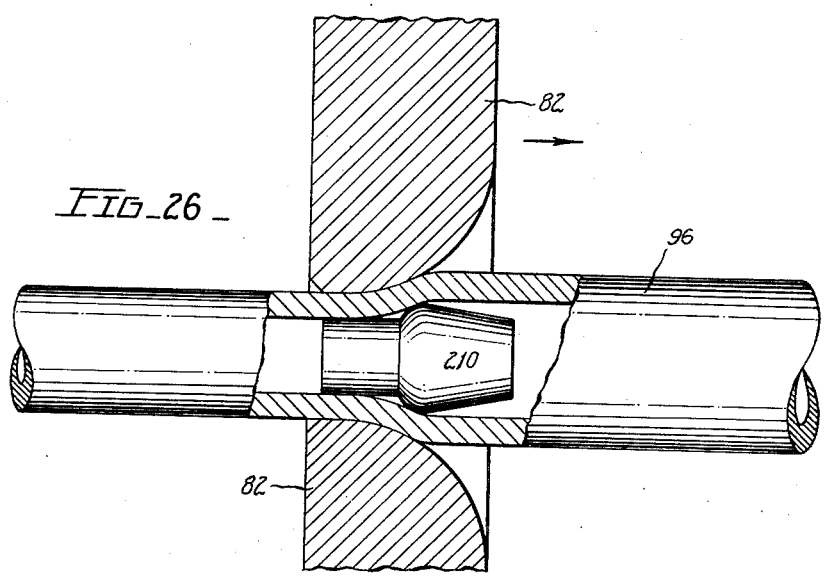
FIG_26_
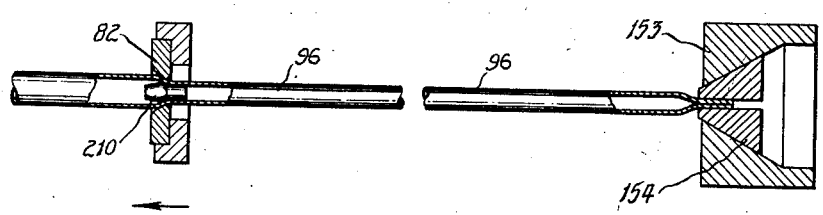
FIG_27_
INVENTORS:
LEONARD F. WHITE AND
ERNST FISCHL
By Young, Emery & Thompson
Attys.

Patented Apr. 6, 1954

2,674,367

UNITED STATES PATENT OFFICE 2,674,367

DRAWBENCH

Leonard Faulkner White, Port Kembla, New South Wales, and Ernst Fischl, Wollongong, New South Wales, Australia, assignors to Metal Manufactures Limited, Melbourne, Victoria, Australia, a corporation of Victoria Application August 10, 1949, Serial No. 109,495

Claims priority, application Australia August 30, 1948

14 Claims. (Cl. 205—7)

This invention relates to an improved drawbench for drawing rod and tube.

In existing standard methods of tube and rod drawing, the tube or rod is drawn on a drawbench having a fixed die and a moving carriage or piston with means for gripping the rod or tube. The rod or tube is pulled through the die by the moving carriage or piston. In order to draw straight lengths of tube or rod on a drawbench of standard type it is apparent that the minimum length of floor space necessary for the operation is equivalent to the starting length of the tube or rod plus the finishing length of the tube or rod plus an extra working space at each end of the machine. Thus for drawing a tube or rod 40 feet long, an overall working length in excess of 80 feet is required.

A further characteristic of drawbenches of existing type for use in tube and rod drawing, is that drawing of the tube or rod takes place only during the movement of the carriage in one direction, the carriage then being returned to the starting position for the next drawing operation. On modern drawbenches, the speed of return of the carriage has been substantially increased, but it has not hitherto been found possible to utilise the return movement of the carriage for the drawing of further tubes or rods without adding to the working length of the machine or introducing other disabilities.

A further disadvantage of standard type drawbenches is that complex equipment is required for the handling and operation of the plug rod, i. e. the rod which holds the plug over which the tube is drawn, and also for the feeding of the tubes. The intricate nature of the plug rod handling and tube feeding equipment greatly increases the cost of the machine, and in many cases also increases the difficulty of operation and the cost of maintenance.

It is an object of this invention to provide an improved drawbench for tube and rod drawing in which the abovementioned disadvantages are overcome to a substantial degree, while a further broad object is to construct a drawbench having a new and improved principle of operation, and by means of which considerable improvements in tube and rod drawing technique are effected.

More specifically the invention has for its objective the provision of an improved drawbench having, inter alia, the following advantages:

1. The drawbench of this invention occupies greatly reduced working space compared with a standard drawbench used for drawing tubes of the same length;

2. The invention enables the return stroke or movement of the carriage to be utilised, thus increasing the operating efficiency of the machine;

3. The invention enables the elimination of the complex plug rod handling and tube feeding equipment provided on modern drawbenches of standard type and consequently enables a drawbench to be produced at much lower cost, particularly for the production of long lengths of straight tubing;

4. The invention enables a drawbench to be constructed which is more efficient in operation, and is more easily controlled and operated than existing drawbenches.

Other objects and features of the invention will be apparent from the ensuing description.

A drawbench constructed according to the invention comprises essentially a pair of grippers mounted on the drawbench and in which the ends of tubes may be gripped, a pair of dies each of which is adapted to co-operate with a gripper, means for reciprocating the dies between the grippers, means for feeding the end of a tube through each die and into the corresponding gripper when the same are in proximity to one another, and means for moving each die away from the corresponding gripper in order to draw a tube during each traverse of the dies in each direction.

More particularly, a drawbench constructed in conformity with the invention may consist of a frame or bed, a pair of grippers mounted on the frame or bed and capable of being secured in stationary or substantially stationary positions thereon, the grippers being normally disposed at opposite ends of the frame or bed, means for actuating the grippers to enable them to grip the ends of tubes or rods, a carriage movable longitudinally of the bed from one end to the other thereof, dies on the carriage, means for moving the dies into operative or inoperative positions, and means for reciprocating the carriage along the bed, the carriage being moved in one direction with one of the dies in operative position from a point adjacent one of the grippers in order to draw the tube or rod held in such gripper and being then moved in the opposite direction with its other die in operative position from a point adjacent the other gripper in order to draw tube or rod held in the latter gripper.

According to one feature of the invention the carriage is constructed in such a manner as to effect eccentric drawing of the tube or rod, i. e. so as to draw the tube or rod on one side of the centre line of the machine. This enables the tubes or rods to be loaded into the die grippers with ease and facility, and also simplifies the unloading and removal of the drawn tubes or rods. In addition, a machine constructed in this manner occupies less working space and possesses other operating advantages.

Another feature of the invention resides in the fact that grippers may be located in any desired position along the bed of the machine and are provided with power actuated jaw closing mechanism which can be set in operation by the operator by push button control means. The gripper mechanism is also preferably provided with means whereby the gripper may move through a restricted distance in the same direction as the die during the initial movement of the latter the said movement of the gripper being resisted by a dashpot or like means, so that the commencement of the drawing operation takes place against resilient means in order to avoid an abrupt shock to the tube at the start of drawing.

The machine of our invention also embodies a number of safety measures so as to provide for stoppage of the die carriage at the end of its traverse in each direction, and so as to provide for possible over-running of the carriage. These measures include photoelectric means for applying brakes to the motor and to the driving mechanism of the die carriage when the carriage reaches a predetermined point adjacent to the gripper at the end of its traverse, while a further measure includes the provision of mechanical means for cutting off the electric power supply to the machine in the event that the carriage reaches a second predetermined point beyond the first-mentioned point in its travel. A still further safety measure consists in providing a dashpot of a substantial length associated with the gripper mechanism, whereby the gripper may move rearwardly through a predetermined additional distance in the event of the die carriage over-running. A further safety measure consists in providing a V-belt drive between the motor on the die carriage and the driving mechanism for such carriage, whereby in the event of the other measures failing, these belts are caused to disengage from their pulleys.

A further feature of the invention lies in ensuring that the tube or rod being drawn enters the moving die at right angles to the plane of such die, this being preferably effected by means of guide tubes disposed a short distance in advance of each die and through which the tube or rod being drawn is caused to pass prior to its entry to the die.

A still further feature of the invention consists in constructing the abutment or mounting for the die in such a manner that the tube or rod after passing completely through the die may fall downwardly without obstruction onto a stand or rack disposed at the side of the machine from which it may be removed by the operator when desired. For this purpose each die mounting or abutment may be provided with a downwardly open recess through the open lower end of which the drawn tube or rod may fall. The said recess also serves to accommodate the gripper which is adapted to be brought into proximity to the die at the commencement of the drawing operation.

A pair of dies is employed, one of which is used to draw tube or rod in one direction, and the other to draw tube or rod in the other direction, and we provide automatic means for moving each die into operative position immediately prior to drawing with such die, the other die being automatically moved to the inoperative position at the same time. At the end of that traverse the positions of the dies are automatically reversed.

The drawing of tube by means of the moving die drawbench of this invention is made possible by the use of a "floating plug." Floating plugs have been used previously in standard type drawbenches, but have not hitherto been used in a drawbench of the type contemplated by this invention. The floating plug comprises a free unanchored plug which is provided with a tapered or curved surface over which the tube is drawn, and which remains balanced in the drawing position inside the tube in the die by the opposing forces of the pull on the shank of the plug in the direction of drawing and the reaction or thrust on the ball or shoulder of the plug in the opposite direction. According to this invention a floating plug is inserted in position in the tube prior to drawing, and when the end of the tube is fitted in the gripper, the floating plug is adjacent to the die and in the correct position relative to the die for the drawing operation. When drawing is effected, the floating plug is moved along the tube by the die, and remains in the same relative position slightly in advance of the die during the drawing operation. When drawing of the tube is completed, the floating plug falls out of the end of the tube and drops into a receptacle disposed at an appropriate point. The floating plugs are thus moved from one end of the machine to the other during the drawing operation, and are returned by the operator in the process of inserting the plug in a fresh tube, this insertion being preferably effected by blowing the plug along the tube by compressed air.

Having described the object and nature of this invention reference will now be made to the accompanying drawings which illustrate a preferred form of the invention. In these drawings—

Figures 1 and 1a (which are shown on separate sheets for convenience of illustration) comprise a side elevation of a drawbench constructed in accordance with the invention.

Figures 2 and 2a (which are also shown on separate sheets) comprise a plan view of the machine shown in Figures 1 and 1a.

Figure 3 is a view in sectional end elevation taken on the line 3—3 of Figure 1.

Figure 4 is a view in sectional end elevation taken on the line 4—4 of Figure 1a.

Figure 5 is a view in sectional end elevation taken on the line 5—5 of Figure 1a.

Figure 6 is a view in sectional side elevation of the die carriage.

Figure 8 is a view in end elevation of the die and die holder in operative position.

Figure 9 is a similar view of Figure 8 showing the die and die holder partly raised towards the inoperative position.

Figure 10 is a sectional view on the line 10—10 of Figure 8.

Figure 11 is a sectional view taken on the line 11—11 of Figure 9.

Figure 12 is a sectional view taken on the line 12—12 of Figure 11.

Figure 13 is a sectional plan view of the die changing mechanism.

Figure 14 is a sectional view taken on the line 14—14 of Figure 13.

Figure 15 is a sectional view taken on the line 15—15 of Figure 13.

Figure 16 is a view in sectional end elevation showing the mechanism for adjusting the position of the fixed saddle.

Figure 17 is a view in sectional end elevation showing the mechanism for locking the fixed saddle in position.

Figure 18 is a view in sectional side elevation showing the mechanism for connecting the gripper saddle and fixed saddle.

Figure 19 is a view in sectional side elevation showing the over-run switch mechanism.

Figure 21 is a view in sectional side elevation of the gripper actuating mechanism, and is taken on the line 21—21 of Figure 20.

Figure 22 is a plan view of the mechanism shown in Figure 21.

Figure 25 is a view in sectional side elevation of the dash pot mechanism.

Fig. 26 is a sectional view showing a floating plug in position in the tube during the drawing operation.

Figure 27 is a sectional view showing the method of tube drawing using a floating plug.

Figure 1A:
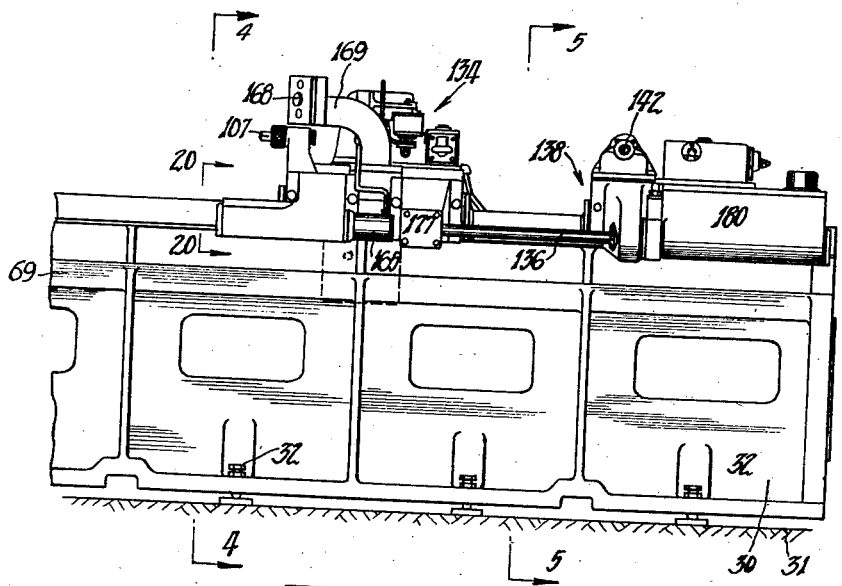

Referring to the drawings, a moving die drawbench is illustrated which comprises a bed 30 supported on a foundation 31 by means of adjusting screws 32 and extending the full length of the machine. The bed 30 is provided with a pair of parallel slideways 33 which also extend the full length of the machine. A die carriage 34 is slidably mounted on the slideways 33 so as to be movable longitudinally of the machine. The die carriage is provided with horizontal surfaces which engage the upper horizontal surfaces of the slideways 33 and with vertical faces of one only of said slideways 33.

Means are provided to ensure continuous lubrication of the engaging faces of the die carriage 34 and slideways 33 during motion of the carriage.

A pair of toothed racks 35 extend longitudinally of the machine beneath the slideways 33 and within the bed 30 and are secured to the bed 30 by dowel pins 36 at intervals along the bed 30. The carriage is driven along the bed by four drive pinions 37 which engage the racks 35 and are driven through differential gearing and belt drive by an electric motor 38 (main drive motor) mounted on the carriage 34.

The carriage 34 is provided with a differential casing 39 which depends between the slideways 33 and within the interior of the bed 30, and two drive pinions 37 are disposed on each side of the casing 39 so as to engage the teeth on the underside of each rack 35. Each drive pinion 37 is mounted on a drive shaft 40 which is rotatable in ball bearings 41, 42 in the casing 39, and the said drive shafts 40 are driven by a pair of secondary differentials 43, 44 of the bevel gear type mounted at opposite ends of the carriage 34. Each secondary differential is fitted with a worm wheel 45 which is driven by a secondary worm 46 mounted on a secondary worm shaft 47 above the worm wheel 45. The secondary worm shafts 47 extend longitudinally of the carriage 34 and are rotatable in ball bearings 48 mounted in said casing 39. The inner ends of the secondary worm shafts 47 are driven by a primary differential 49 of the spur gear type mounted centrally in the upper portion of the carriage 34. The primary differential 49 is provided with a primary worm wheel 50 which is driven by a primary worm 51 on a primary worm shaft 52 carried rotatably in ball bearings 53 mounted in the upper part of the carriage 34. The primary worm shaft 52 extends to one side of the carriage 34 and is fitted with a pulley 54 having a plurality of grooves for a series of V-belts 55.

The main drive motor 38 is mounted on the carriage 34 at one end thereof and is also provided on its shaft with a pulley 56 in lateral alignment with the pulley 54 on the primary worm shaft 52. The pulleys 54, 56 are connected by an appropriate number of V-belts 55. The motor mounting 57 is supported slidably on guides 58 secured to the carriage 34 and an adjusting screw 59 is provided for adjusting the position of the motor mounting 57 on said guides 58 and a locknut 60 serves to lock the mounting 57 in any position to which it is moved.

The pulleys 54, 56 are extended to form brake drums 61, 62 respectively and solenoid brakes 63, 64 are fitted on these pulleys, the said brakes 63, 64 being supported on platforms 65 extending laterally from and secured to the carriage frame. The brakes 63, 64 are actuated to the braking position by springs 63' (Fig. 1) and 64' (Fig. 3). The brakes are held in the non-breaking position by the solenoids 65'. When the carriage 34 reaches a predetermined position at each end of its traverse, an arm on the carriage interrupts a light beam which is directed onto a photo-electric cell (as hereinafter described) and this operates a limit switch which cuts off the current to the solenoids 65' and causes the solenoid brakes 63, 64 to be applied so as to stop the carriage.

By means of the driving mechanism above described, it will be appreciated that uniform driving forces are applied to the four drive pinions 37 irrespective of the eccentric forces applied to the carriage 34 during its movement by the dies which, as will be explained later, are mounted on one side of the carriage. Moreover, owing to the arrangement of differentials 43, 44, 49, it will be seen that the carriage 34 will stop if any one of the drive pinions 37 should become loose or break.

A main lubricating pump 66 is mounted on the carriage 34, and is driven by an electric motor 67. The pump 66 functions to supply oil under pressure to the slideways 33 so that the carriage 34 slides on a film of oil, thus reducing wear on the slideways 33 to a negligible quantity. The oil forced on to the slideways is picked up by a wiper 68 during the motion of the carriage, and the spent oil, after lubrication of the slideways, flows downwardly into troughs 69 formed on the bed 30 at each side thereof, and from thence it flows into the interior of the bed 30 and is collected in the bottom of the bed which functions as a sump 70. A pick-up nozzle 71 is provided on the lower end of a pipe 72 to pick up oil from the sump 70, and this oil is pumped through filters 73 prior to its use again for lubrication. A pressure switch 74 is provided adjacent to the main pump 66 to ensure that the main motor 38 cannot start until the oil in the main lubricating system reaches a predetermined pressure.

A secondary lubricating system is provided for lubricating the shaft bearings of the carriage driving mechanism. The pump 75 for operating this system is a plunger type pump and is actuated by an eccentric 76 on the end of one of the secondary worm shafts 47. The oil is pumped through a filter 77 and from thence to the bearings of the drive mechanism.

Current to drive the motors 38 and 67 is obtainable from trolley wires 78 extending longitudinally of and on one side of the machine. The wires 78 are supported on insulators 79 secured to brackets 79a attached to the bed 30, and an electrical trolley 80 having pulleys 81 in engagement with the wires 78 is mounted on the carriage 34.

A pair of dies 82, 83 is provided on the die carriage 34, the said dies being mounted at an appropriate distance apart, and being disposed so as to draw tubes or rods in opposite directions. When viewing the machine from the operator's side, i. e. from the side of the machine on which the dies are placed, the left hand die 82 is used for drawing when the carriage is moving from left to right, and the right hand die 83 is used for drawing when the carriage is moving from right to left. This terminology with respect to the dies will be used in the ensuing description.

Each die 82, 83 is mounted in a die holder 84 (or 85) which is capable of rotation about a horizontal axis into an operative position (see Figure 8) in which the die holder 84 (or 85) is located in engagement along three sides with a die abutment bracket 86 (or 87) or into an inoperative position in which the die holder 84 (or 85) is swung upwardly out of engagement with the die abutment bracket 86 or 87 (see Figure 9). The die 82, 83 is held in an aperture in the die holder 84 by a die holder locking ring 84a (see Figure 11). Each die abutment bracket 86 or 87 is secured rigidly to the carriage 34 and is furnished with a downwardly open recess 88 or aperture through which the gripper is adapted to fit when the carriage is moved to an end position, whereby the gripper can be brought into close proximity with the die 82, 83.

Each die holder 84, 85 is mounted on and secured to a die holder shaft 89, 90 rotatably supported in bearings 91 on the die abutment bracket 86, 87. The actuation of the die holder shafts 89, 90 is described later. When the die holder 84, 85 swings downwardly to its lowermost or operative position it engages a spring loaded wedge 92 (see Figure 10). The wedge 92 is actuated towards the die holder by a spring 93 located between it and a wedge cap 94 secured to the die abutment bracket. The die holder 84, 85 is recessed slightly to form an inclined shoulder 95 which engages the wedge 92. The die holder 84, 85 is thus held firmly but releasably in its operative position.

The tube or rod 96 being drawn is fed through a guide tube 97 into the die 82 or 83. Each guide tube 97 is slightly flared at each end and is held in a guide tube holder 98 secured to the die abutment bracket 86, 87. The guide tube 97 is held in the guide tube holder 98 by a clamp 99 which is tightened by a knurled nut 100 on a clamp bolt 101 (see Figure 12).

Figure 2A:
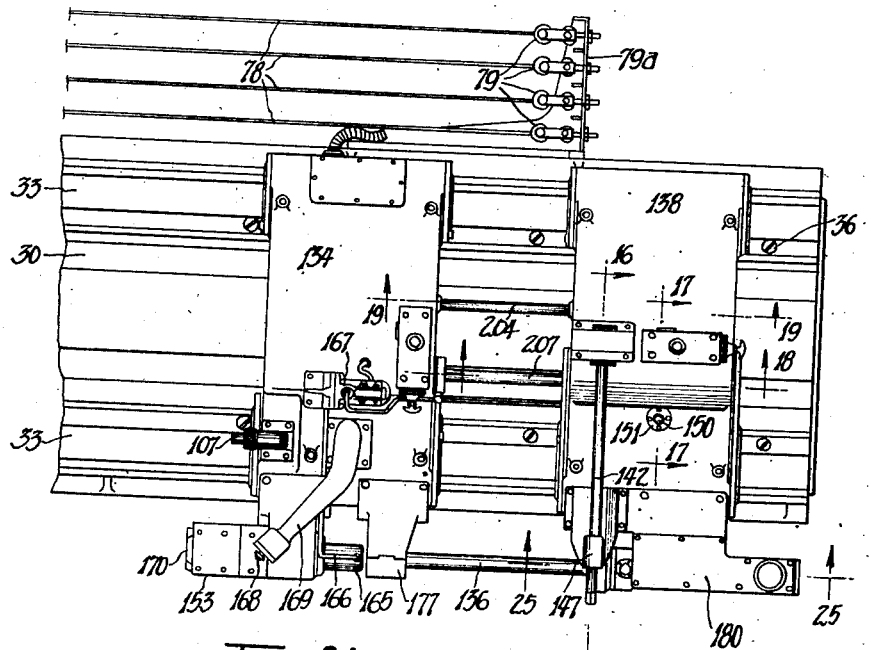
Figure 7:
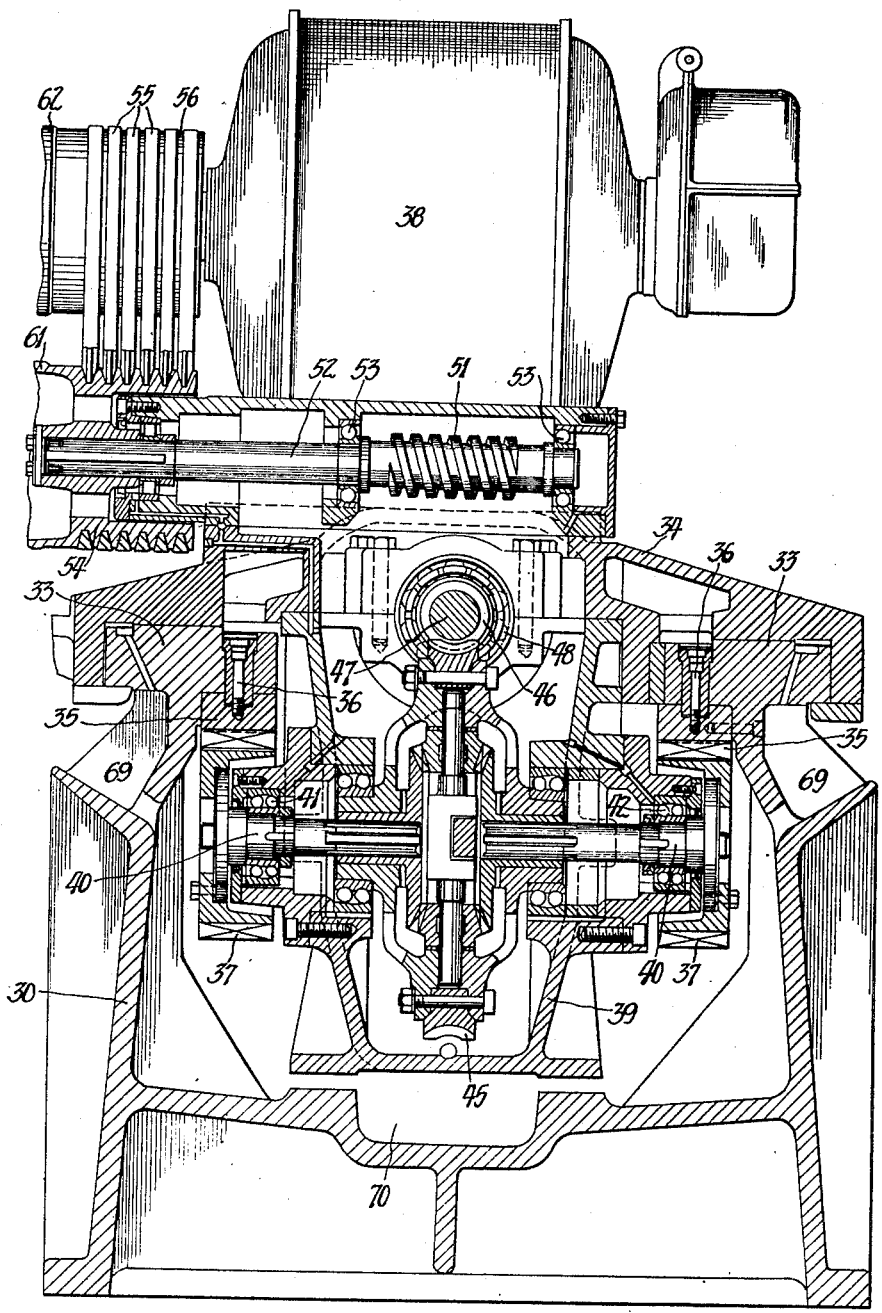
Figure 7 is a view in sectional end elevation of the die carriage.
Figure 20:
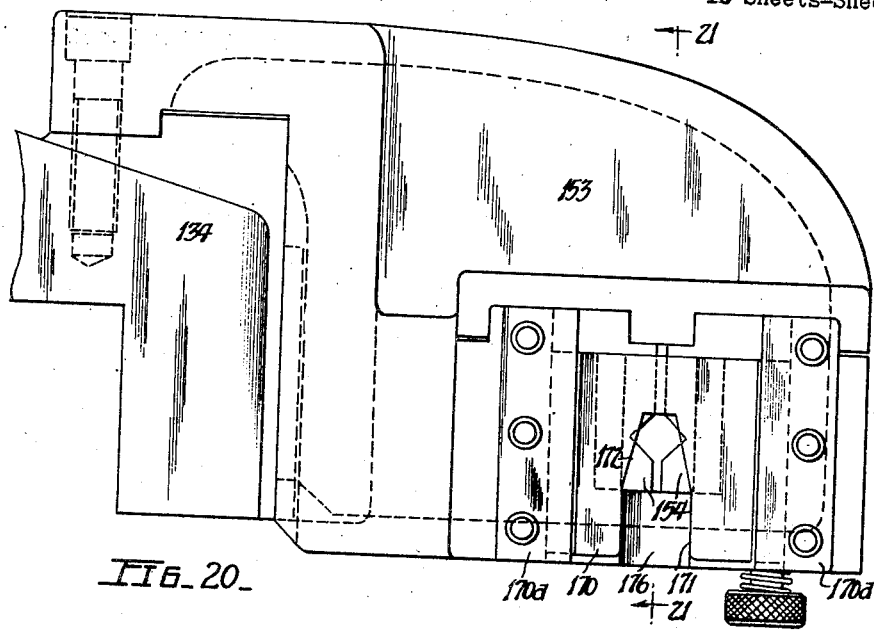
Figure 20 is a view in end elevation of a gripper.
Figure 23:
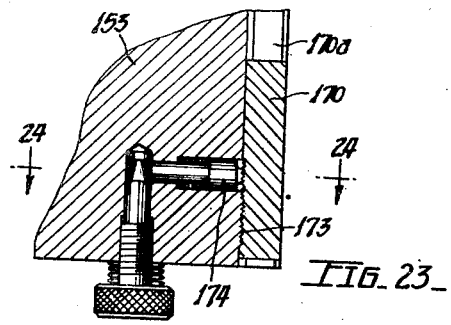
Figure 23 is a sectional view showing the mechanism for locking the ejector plate in position.
Figure 24:
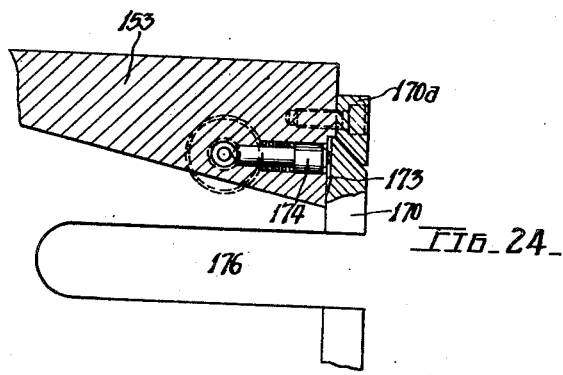
Figure 24 is a sectional view taken on the line 24—24 of Figure 23.

The mechanism for changing the positions of the die holders 84, 85 is illustrated in Figures 13, 14 and 15. A pair of die changing push rods 102, 103 are slidably mounted in push rod guides 104 secured to a crank case 105 mounted on the die carriage 34. The die changing push rods 102, 103 are adapted to engage push rod stops 106, 107 mounted on the gripper saddles, as shown in Figures 2 and 2a, when the die carriage 34 approaches the end of its travel in each direction. By this means the die changing push rods 102, 103 are moved longitudinally in the push rod guides 104. The inner ends of the die changing push rods 102, 103 are secured to the ends of a rack 108 (see Figure 14) which is in engagement with a pinion 109. The pinion is keyed to a pinion shaft 110 which is rotatable in bearings in the crank case 105. The pinion shaft 110 is connected by bevel gears 111, 112 to a crank shaft 113 which is rotatable in bearings 114, 115 supported in the crank case 105, the crank shaft 113 being at right angles to the pinion shaft 110 and extending longitudinally of the machine. Cranks 116, 117 are secured to the ends of the crank shaft 113 and are connected by connecting rods 118, 119 to actuating levers 120, 121 secured to the die holder shafts 89, 90. The die holder shafts 89, 90 are rotatably supported adjacent to the actuating levers 120, 121 by bearings carried in brackets 122 secured to the die carriage 34.

The cranks 116, 117 are arranged in diametrically opposed positions so that the positions of the die holder shafts 89, 90 and the die holders 84, 85 are reversed when the die changing mechanism is actuated. The connecting rods 118, 119 are each telescopic, the two parts of each connecting rod being relatively movable (to shorten the connecting rods) against the action of a spring 123 and outward relative movement of the parts being limited by a stop screw 124. An inspection opening 125 is provided in the crank case 105 and is closed by a cover plate 126.

Movement of the die changing push rods 102, 103 in one direction when the die carriage 34 approaches the end of its travel causes the pinion 109 to be rotated by the rack 108 and this rotation is transmitted to the crank shaft 113 by the bevel gears 111, 112, the cranks 116, 117 are thereby rotated and in turn impart rotation through a fixed angular distance to the die holder shafts 89, 90 by means of the connecting rods 118, 119 and actuating levers 120, 121. The extent of the rotation imparted to the die holder shafts 89, 90 is such that the die holders 84, 85 are reversed in position, i. e. the die holder which is in the operative position is moved upwardly to the inoperative position, and the die holder which is in the inoperative position is moved downwardly to the operatve position. If the die carriage is approaching the left hand end of the machine the right end die holder is moved to the inoperative position and the left hand die holder is moved to the operative position.

Mechanism is provided (see Figure 15) to retain the cranks 116, 117 in their limiting positions. This comprises a spring loaded plunger 127 which is slidable in a recess formed between a cover plate 128 and the crank case 105, the plunger 127 being urged outwardly by a plunger spring 129, the inner end of which bears against a stop plug 130. A roller 131 is rotatably mounted on the outer end of the plunger 127 and engages the inner surface of the crank 116 or 117. When the crank is in its limiting position the roller 131 engages in a recess 132 formed in the crank. This retains the die holders 84, 85 in their limiting positions and the plunger 127 is readily depressed to allow movement of the crank 116 or 117 when the die changing mechanism is again actuated by one of the die changing push rods 102, 103.

As previously stated mechanism is provided at each end of the machine for gripping the ends of the rods or tubes to be drawn. This mechanism is mounted on gripper saddles 133, 134 (see Figures 2, 2a and 4) which are slidable on the slideways 33. The gripper saddles 133, 134 are connected by gripper buffer rods 135, 136 and dashpot mechanism (hereinafter described) to fixed saddles 137, 138 which are also slidable on the slideways 33, but are locked in position by locking mechanism (see Figure 17).

The mechanism for adjusting the position of each fixed saddle 137, 138 along the machine is shown in Figure 16. This comprises a racking pinion 139 which engages one of the racks 35 and is secured to a shaft 140 carried in bearings 141 mounted in the lower part of the fixed saddle 137 or 138. The shaft 140 is connected to a saddle moving shaft 142 by sprocket wheels 143, 144 and sprocket chain 145. The saddle moving shaft 142 extends transversely of the saddle and is supported in bearings 146, 147. A racking handle 148 may be attached to the outer end of the saddle moving shaft 142 for rotating said shaft. By operation of this handle the saddle 137 or 138 may be moved in either direction along the slideways 33 provided the locking mechanism has been released.

The locking mechanism is illustrated in Figure 17. This comprises a saddle locking pawl 149 which is adapted to engage the rack 35. The saddle locking pawl 149 is vertically slidable in guides formed in the saddle and is threaded to receive the threaded lower end of a saddle locking shaft 150, the upper end of which is rotatable in a bearing 151 mounted in the saddle. A handle 152 is attachable to the upper end of the saddle locking shaft 150 for imparting rotation thereto. By rotating the shaft 150 the saddle locking pawl 149 may be moved upwardly into engagement with the rack 35 so as to lock the fixed saddle 137 or 138 in the required position on the bed 30.

Each gripper saddle 133, 134 is provided on the operating side of the machine with a gripper body 153 in which the gripper jaws 154 are mounted (see Figures 20 to 24). A tapered recess 155 is formed in the gripper body 153 in which the jaws 154 having opposed gripping faces 156 are slidably mounted. The jaws 154 are adapted to close when moved towards the front end of the gripper body 153, i. e. in the direction of the die carriage 34, and are adapted to open when moved in the opposite direction. A T-shaped retractor plate 157 engages in a recess 158 formed in the rear of the jaws 154 and is adapted to move longitudinally with the jaws, while allowing the jaws to move laterally. A tension spring 159 is connected between the retractor plate 157 and a fixed pin 160 on the gripper body to the rear of the jaws, the said spring 159 serving to retain the jaws 154 in their retracted position after the said jaws are forced rearwardly by recoil of the tube 96 following completion of the drawing operation.

A jaw closing plunger 161 is mounted slidably in the gripper body 153 beneath the spring 159, the front end of said plunger 161 engaging the rear ends of the jaws 154 and the rear end of the plunger 161 being secured to a piston 162 mounted in a cylinder 163 at the rear of the gripper body 153. A return spring 164 is disposed between the front end of the piston 162 and an abutment 165 on the gripper body 153.

A compressed air pipe 166 is connected to the cylinder 163 at the rear of the piston 162 for the purpose of admitting air to said cylinder, the admission of such air being controlled by a solenoid air valve 167 actuated by a push button 168 on a control bracket 169, the button 168 being in the control of the operator. On depression of the push button 168, compressed air enters the cylinder 163 and forces the piston 162 and plunger 161 forwardly so as to close the jaws 154. This takes place immediately before the drawing operation commences, and means are provided to release the air pressure in the cylinder 163 after the die carriage 34 has travelled a predetermined distance away from the gripper, the jaws 154 being then maintained closed solely by the forces applied to them by the tube 96. The plunger 161 and piston 162 are returned to the initial position by the return spring 164.

An adjustable ejector plate 170 is retained against the front end of the gripper body 153 by keeper plates 170a, the said plate 170 having a downwardly open recess 171, the upper end of which is upwardly tapered as shown at 172. The ejector plate 170 is provided at each side with serrations 173 on its rear face which are engaged by serrated spring loaded retaining plungers 174. Locking screws 175 engage the rear ends of the plungers 174 so as to lock them in position in order to hold the ejector plate 170 in any position to which it is moved. The recess in the ejector plate 170 is of sufficient width to accommodate the largest tube or rod to be drawn, but is of less width than the maximum opening between the jaws 154 when retracted. Hence when the jaws 154 are opened the end of the tube or rod will be positively freed from the jaws 154 by the ejector plate 170 and will then fall downwardly through the ejector opening 176 (see Figure 24) and out of the gripper. This ensures positive release of the tube from the gripper after completion of drawing.

Each gripper saddle 133, 134 is connected to the corresponding fixed saddle 137, 138 by the gripper buffer rod 135, 136 which is detachably secured at its forward end to a connecting block 177 mounted on the gripper saddle 133, 134 (see Figures 21 and 22) and is connected at its rear end to a piston 178 of a dashpot assembly (see Figure 25). The dashpot assembly is arranged coaxially with the gripper assembly.

The dashpot piston 178 is slidable in a dashpot cylinder 179 formed in a dashpot body 180 secured to the fixed saddle 137, 138. An aperture 181 is formed in the piston 178 which is adapted to be closed by a floating valve 182 mounted slidably within the piston 178. A head or peripheral flange 183 is formed on the gripper buffer rod 135, 136 between the piston 178 and the forward end of the cylinder 179 and is adapted to engage an abutment 184 constituted by the forward end of the cylinder when the gripper buffer rod 135, 136 is in its fully forward position. A gland 185 is provided to surround the gripper buffer rod 135, 136 where it passes through a gland housing 186 secured to the end of the cylinder 179. The gland 185 is held in position by a gland cover 187.

An oil reservoir 188 is provided in the dashpot body 180 above the cylinder 179 and communicates with the cylinder 179 through two ports 189 and 190. The piston is adapted to open the front port 189 when the piston 178 is moved rearwardly to a predetermined extent. The forward end of the cylinder 179 communicates with the oil reservoir 188 through port 191 which is adapted to be closed by a needle valve 193. The needle valve 193 is adjustable by means of an adjusting screw 194 and is locked in position by a locking screw 195. A dome nut 196 fits over the screw 194. A breather tube 197 is fitted in the upper end of the oil reservoir to allow egress or ingress of air.

During rearward movement of the gripper buffer rod 135, 136 caused by movement of the gripper saddle 133, 134 towards the fixed saddle 137, 138, the piston 178 moves from the front end towards the rear end of the cylinder 179, oil being allowed to pass through the apertures 181 in the piston 178 from one side of the piston to the other. When the gripper buffer rod 135, 136 is moved in the opposite direction at the commencement of drawing, the valve 182 in the piston 178 closes so as to prevent passage of oil through the aperture 181 in the piston. While the piston is located rearwardly of the front port 189 so that such port is uncovered, oil is free to circulate from the front portion of the cylinder 179 into the oil reservoir 188, and from the oil reservoir 188 into the rear portion of the cylinder 179 as the piston moves. However, when the gripper buffer rod 135, 136 approaches the last portion of its travel in a forward direction, the piston 178 covers the front port 189 and during subsequent forward movement oil is able to leave the front portion of the cylinder 179 only through the valve-controlled port 191 and port 192. The mechanism then functions as a dashpot and the force resisting movement of the gripper buffer rod 135, 136 is determined by the adjustment of the needle valve 193.

The mechanism for arresting movement of the die carriage 34 along the machine includes arms 198 (see Figure 2), one of which projects from each end of the carriage 34 and is adapted to interrupt a light beam indicated at 199 (see Figure 4) which passes between a light source 200 and a photo electric cell and relay 201 mounted beneath each gripper saddle 133, 134. Breaking of the light beam 199 causes the photoelectric cell and relay 201 to actuate a limit switch which cuts off the current to the electric motor 38 and the solenoids 65' and causes the brakes 63, 64 to be applied, thus stopping the carriage.

In case over-running of the carriage should occur, a second limit switch 202 is provided beneath the fixed saddle 137, 138 (see Figures 5 and 19) the actuating lever 203 of which is actuated by a trip rod 204 secured to the gripper saddle 133, 134 (see Figure 19). The trip rod 204 is slidable in a guide 204a and is adjustable by means of adjusting nuts 204b.

If the carriage should over-run owing to failure of the photo-electric relay 201 or light source 200 or any associated part, the carriage will strike the gripper saddle 133 or 134 and will cause same to move towards the respective fixed saddle 137 or 138 and after the gripper saddle has moved through a predetermined distance, the trip rod 204 will engage the actuating lever 203 of the limit switch 202. The limit switch 202 then acts upon a contactor (not shown) which is not otherwise under load and this contactor then cuts off the power to the electric motor 38 and the carriage is brought to a stop by a piston 205 (see Figure 18) slidable in an air cylinder 206 in the fixed saddle 137, 138. The piston 205 is secured to the rear end of a piston rod 207, the front end of which is secured to the gripper saddle 133, 134 by an anchor bracket 208. Air under pressure is admitted to the rear end of the cylinder 206 through pipe 209.

In the operation of the moving die drawbench previously described, the die carriage 34 at the completion of a traverse, moves to a position at which the die 82 or 83 to be used in the next drawing operation is located in close proximity to the front end of the gripper to be used in such drawing operation. After the carriage has stopped and the previously drawn tube 96 is dropped from the gripper, the tanged end of the next tube is fed by the operator through the guide tube 97 and die 82 or 83 into the gripper. If tube is being drawn, a floating plug 210 (see Figs. 26 and 27) has previously been blown up into the tube by the operator at the other end of the machine. The first-mentioned operator then presses the starting button 168 which operates the solenoid air valve 167 causing compressed air to enter the gripper air cylinder 163. The jaw closing plunger 161 is thus moved forwardly and closes the jaws 154 on the tanged end of the tube 96. After a brief time delay the carriage 34 is automatically caused to move in a direction away from the gripper to commence drawing of the tube. During the initial movement of the carriage the gripper saddle 133 or 134 travels for a short distance in the same direction as the carriage 34, the movement of the said gripper saddle being regulated by the dashpot as previously described. When the head 183 on the gripper buffer rod 135 or 136 strikes the abutment 184 on the dashpot body 180 the movement of the gripper saddle is arrested and the end of the tube is then held stationary relative to the bed 30 of the machine during the remainder of the drawing operation.

The carriage 34 travels towards the other end of the machine and carries out the drawing operation during such movement. The operation of the floating plug 210 during drawing is shown in Figs. 26 and 27, the plug 210 being shown within the tube 96 which is being drawn by the die 82. In Figure 26, the die 82 is being moved from left to right and in Figure 27, the die 82 is being moved from right to left. When the die in operation reaches the end of the tube it passes over said end and the tube falls downwardly out of the die assembly. The recoil of the tube on release from the die forces the jaws 154 rearwardly in the gripper and the gripped end of the tube is released from the gripper and falls downwardly as previously described. The jaws 154 are held in the retracted position by the tension spring 159. The tube is therefore released at both ends and falls downwardly on to a rack or stand (not shown) disposed at the side of the machine. The drawn tubes may be removed in batches from this stand at suitable intervals.

As previously stated, when the die carriage 34 is approaching the end of its travel in one direction, an arm 198 on the carriage breaks a light beam 199 which is directed on to a photo-electric cell 201. Interruption of this beam 199 actuates the first limit switch which causes operation of the solenoid brakes 63, 64 on the carriage 34. This causes the carriage to stop within a predetermined distance, depending on the effectiveness of the brakes. Preferably the first limit-switch is actuated in time to cause the carriage 34 to stop when the gripper buffer rod 135 or 136 has been moved to a position at which the front port 189 in the dashpot cylinder 179 is about to open. The carriage 34 engages the gripper saddie 133 or 134 prior to this and moves it to the extent above indicated before coming to rest. It will be appreciated that if the photo-electric mechanism should fail, or if the beam should be interrupted unintentionally, the carriage will be brought to a stop, so that the mechanism has a high safety factor.

If, owing to brake wear or other reason, the carriage runs beyond the point above indicated before coming to rest, the trip rod 204 actuates mechanically the second limit switch 202 which stops the machine.

Substantial length is provided in the dashpot cylinder 179 to allow for possible over-running of the carriage 34 although it will be apparent from the safety measures provided that over-running beyond the limits indicated is unlikely. The air piston 205 returns the gripper saddle to its correct position in the event of over-running, and the air piston 205 and air cylinder 206 also function as a pneumatic buffer should over-running occur.

A further safety measure is provided by the V-belts, as previously described.

Prior to the die carriage 34 engaging the gripper saddle 133 or 134, the die changing mechanism is actuated by the respective die changing push rod 102 or 103 engaging the respective push-rod stop 106 or 107 on the gripper saddle. This is effected after the previous tube 96 has been drawn. The die 82 or 83 used for the previous drawing operation is moved upwards to its inoperative position and the other die is swung downwards to its operative position so that the latter die reaches such position immediately prior to the die carriage 34 engaging the gripper saddle 133 or 134. As soon as the die carriage has come to rest, the next tube may be fed by the operator through the operative die and into the gripper ready for the next drawing operation. The operator then actuates the "start" button 168 and the cycle recommences.

In the event of a tube or rod breaking during the operation, the die carriage 34 may be returned by push-button control (not shown) to either end of the machine.

In the following claims the word "tube" includes both tube and rod.

We claim:

1. A tube drawing drawbench comprising a frame, a pair of grippers mounted in spaced relation on the frame, a die carriage slidable on the frame, means for reciprocating the die carriage between the grippers, a pair of dies mounted on the die carriage, each die having an operative position and an inoperative position and being disposed in line with the grippers when in its operative position, die changing mechanism for moving one die to its operative position and the other to its inoperative position, means for actuating the die changing mechanism prior to each traverse of the carriage in each direction, a floating plug positioned in the tube adjacent the die, the operative die being moved by said die changing mechanism to a position adjacent to a gripper whereby the end of a tube to be drawn may be fed through the operative die into the gripper, the traversing of the carriage drawing said operative die away from the gripper so that the said die is drawn over the gripped tube.

2. A tube drawing drawbench comprising a frame, a pair of grippers mounted in spaced relation on the frame and located to one side of said frame, means on each gripper for gripping the end of a tube and for releasing said end after the tube has been drawn, a carriage slidable on the frame, means for traversing the carriage in each direction along the frame, a pair of dies mounted on the carriage, each die having an operative position and an inoperative position and in its operative position being disposed to one side of the frame and in line with the grippers, one die being operative when the carriage is traversed in one direction and the other being operative when the carriage is traversed in the other direction, die changing mechanism on the carriage for changing the positions of the dies, means for actuating the die changing mechanism prior to each traverse of the carriage, the end of a tube being fed through the operative die and into the corresponding gripper prior to each traverse, a floating plug positioned in the tube adjacent the die, the traversing of the carriage drawing the operative die away from the gripper and over the full length of the tube, and the space beneath the tube being unobstructed so that the latter falls downwardly out of the die and gripper after being drawn.

3. A drawbench according to claim 1 and having slideways extending longitudinally of the frame on which the said die carriage is slidable, racks mounted beneath the slideways, pinions mounted on the said die carriage and engaging the racks, an electric motor on the said die carriage, and differential gearing on the carriage through which the pinions are driven from the electric motor.

4. A drawbench according to claim 1, and having a pair of die holders mounted on the said die carriage, one of said dies being supported in each die holder, each die holder being disposed to overhang the side of the frame and being formed to allow the tube to fall downwardly when the die has passed completely thereover, the die holders being moved to the operative and inoperative positions by the die changing mechanism, and means for automatically actuating the die changing mechanism at the end of each traverse of the carriage.

5. A drawbench comprising a frame, a pair of grippers mounted in spaced relation on the frame and located to one side of said frame, gripper jaws in each gripper for gripping the end of a tube to be drawn and for releasing said end after the tube has been drawn, a die carriage slidably mounted on the frame and which is reciprocated along the frame between the grippers to effect drawing of tubes held in the grippers, a motor on the carriage for driving it along the frame, a pair of die holders on the carriage and disposed to overhang one side of the carriage, dies supported in said die holders, die changing mechanism on the carriage for moving one die holder into an operative position in which the die in said holder is in line with the grippers and for simultaneously moving the other die holder to an inoperative position in which the die in said other holder is out of line with the grippers, and means for actuating the die changing mechanism when the carriage reaches the end of each traverse so as to move to the inoperative position the die which has completed drawing and to move the other die to the operative position.

6. A drawbench comprising a frame, a pair of grippers mounted in spaced relation on the frame and located to one side of said frame, gripper jaws in each gripper for gripping the end of a tube to be drawn and for releasing said end after the tube has been drawn, a die carriage slidably mounted on the frame and which is reciprocated along the frame between the grippers to effect drawing of tubes held in the grippers, a motor on the carriage for driving it along the frame, a pair of die holders on the carriage and disposed to overhang one side of the carriage, dies supported in said die holders, die changing mechanism on the carriage for moving one die holder into an operative position in which the die in said holder is in line with the grippers and for simultaneously moving the other die holder to an inoperative position in which the die in said other holder is out of line with the grippers, means for actuating the die changing mechanism when the carriage reaches the end of each traverse so as to move to the inoperative position the die which has completed drawing and to move the other die to the operative position, means for stopping the carriage at the end of each traverse when the die next to be operative is in proximity to a gripper, the end of a tube to be drawn being then inserted through said die and into said gripper, a floating plug being inserted in the tube to a position adjacent to said die prior to drawing, and means for restarting the movement of the carriage when the said tube has been inserted in the gripper.

7. A drawbench according to claim 2 and having brakes on the carriage for arresting its movement along the frame, and mechanism operated at a predetermined point in the travel of the carriage for actuating the said brakes.

8. A drawbench according to claim 2 and having a gripper saddle and a fixed saddle mounted on the frame at each end thereof, one of the grippers being mounted on each gripper saddle, and dashpot mechanism connecting each gripper saddle and fixed saddle whereby the former is capable of limited movement against a restraining force during the initial drawing operation.

9. A drawbench according to claim 2 and having gripper jaws in each gripper, mechanism for automatically closing the jaws at the commencement of drawing, and means for automatically opening the jaws after drawing is completed.

10. A drawbench according to claim 5 and having a gripper saddle and a fixed saddle mounted on the frame at each end thereof, one of the grippers being mounted on each gripper saddle, and dashpot mechanism connecting each gripper saddle and fixed saddle whereby the former is capable of limited movement against a restraining force during the initial drawing operation.

11. A drawbench comprising a frame, slideways extending longitudinally of the frame, a die carriage slidable on the slideways, racks extending longitudinally the frame, pinions on the die carriage which engage the racks, a motor on the die carriage for driving the pinions, brakes on the motor and the carriage for stopping the carriage brake actuating, mechanism on the carriage for automatically actuating the brakes when the carriage approaches the end of its travel in each direction, a pair of die holders on one side of the carriage, a die in each die holder, guide tubes mounted on the die holders adjacent to the dies, die changing mechanism on the carriage for moving the dies alternately to operative and inoperative positions, means for actuating the die changing mechanism when the carriage is near the end of its travel in each direction, a gripper saddle and a fixed saddle mounted on the frame at each end thereof, a gripper supported on each gripper saddle and disposed to one side of the frame the grippers being in line with each die when it is in its operative position, a pair of jaws in each gripper, spring means connected to the jaws and tending to open the jaws, pneumatically operated mechanism connected to the jaws for closing the jaws on the end of a tube prior to drawing, the jaws being held closed by the pull of the tube during drawing and being opened by the spring means when the tube is drawn and the said pull is released, the end of a tube being inserted through the operative guide tube and die and into the corresponding gripper prior to drawing, dashpot mechanism connecting each gripper saddle and fixed saddle to permit limited restrained movement of the former, means for adjusting the position of each fixed saddle on the frame, and means for locking each fixed saddle in position on the frame.

12. A drawbench according to claim 11 and having a pair of said slideways, one of said racks being mounted beneath each said slideway, two pairs of said pinions on said carriage, one pinion of each pair engaging each slideway, a secondary differential driving each pair of pinions, secondary drive shafts driving the secondary differentials, a primary differential driving the secondary drive shafts, a primary drive shaft driving the primary differential, and the said electric motor driving the primary drive shaft.

13. A drawbench comprising a frame, slideways extending longitudinally of the frame, a carriage slidable on the slideways, racks on the frame, pinions on the carriage which engage the racks, a motor on the carriage for driving the pinions, a brake on the motor, a pair of die holders on the carriage, dies in the die holders, guide tubes mounted on the die holders adjacent to the dies, die changing mechanism for moving the dies alternately to operative and inoperative positions, means for actuating the die changing mechanism when the carriage is near the end of its travel in each direction, a gripper support for each gripper and fixed to the frame, a gripper mounted on the frame at each end thereof, brake mechanism for actuating the brake when the carriage approaches the end of its travel in each direction to stop the carriage at the end of each traverse so that a die is in proximity to the corresponding gripper, the end of a tube being inserted through the corresponding guide tube and die and into the corresponding gripper prior to drawing, means for closing the gripper on the end of the tube, and dashpot mechanism connecting the gripper to the gripper support to permit limited movement of the gripper against a restraining force during the initial drawing operation.

14. A drawbench according to claim 13 and having means for adjusting the position of each gripper support on the frame, and means for locking each gripper support on the frame.

References Cited in the file of this patent
UNITED STATES PATENTS

| Number | Name | Date |
|---|---|---|
| 1,754,047 | Belles | June 17, 1930 |
| 2,190,889 | Schunck | Feb. 20, 1940 |

FOREIGN PATENTS

| Number | Country | Date |
|---|---|---|
| 274,244 | Great Britain | July 21, 1927 |